United States Patent Office 3,454,511
Patented July 8, 1969

3,454,511
PLASTICIZED AND STABILIZED CHLORINATED VINYL POLYMER COMPOSITIONS
Friedrich Wollrab and Rene Verschaeve, Brussels, Belgium, assignors to Solvay & Cie, Brussels, Belgium, a Belgian corporation
No Drawing. Filed Nov. 9, 1967, Ser. No. 681,896
Claims priority, application Belgium, Nov. 10, 1966, 689,546
Int. Cl. C08f 45/52, 29/24
U.S. Cl. 260—23 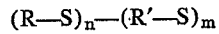 5 Claims

ABSTRACT OF THE DISCLOSURE

The plasticized and stabilized chlorinated vinyl polymer compositions contain a synergistic stabilizing system comprising at least one heat stabilizer and at least one polymer or copolymer of the formula $(R—S)_n—(R'—S)_m$ wherein R and R' are identical or different divalent hydrocarbon radicals and in which $n$ and $m$ are whole numbers higher than 20.

BACKGROUND OF INVENTION

This invention relates to plasticized and stabilized compositions containing chlorinated vinyl polymers.

There are numerous heat stabilizers for chlorinated vinyl polymers. These compounds may be selected from a large number of mineral and organic carboxylic acid salts of metals such as lead, cadmium, calcium, zinc or tin and also from organometallic compounds such as tetraalkyl tin and the like. The epoxy compounds also constitute another class of well known heat stabilizers. A more complete description of heat stabilizers used for chlorinated vinyl compound is found in "La Stabilisation des Chlorures de Polyvinyle," F. Chevassus and R. de Broutelles, Editions Amphora, 1957, pages 91–138, which reference is incorporated herein.

SUMMARY OF INVENTION

It has now been found that mixtures of known stabilizers with certain polymers and copolymers containing sulfur have an unexpected synergetic effect with respect to the heat stability of the plasticized compositions containing chlorinated vinyl polymers, and that the heat stability of such plasticized composition is considerably increased by the addition thereto of a mixture of known stabilizer and said sulfur containing component.

The present invention is directed to plasticized and stabilized compositions containing chlorinated vinyl polymers in which the amount of stabilizer is 0.1 to 10, preferably 1 to 5 parts by weight per 100 parts by weight of the chlorinated vinyl polymer. The components of the system comprise:

(1) At least one known heat stabilizer and (2) At least one polymer or one copolymer of the formula $(R—S)_n—(R'—S)_m$ wherein R and R' are identical or different divalent hydrocarbon radicals, and in which $n$ and $m$ are each whole numbers higher than 20; the weight ratio between the known stabilizers and the sulfur containing components varies between 0.5 and 50.

DESCRIPTION OF PREFERRED EMBODIMENTS

Although any well known stabilizers may be used, the compositions according to the invention are preferably selected from mineral and organic carboxylic acid salts of metals such as lead, cadmium, calcium, zinc or tin. Epoxy compounds and preferably epoxidized oils are also suitable stabilizers.

The polymers and copolymers of the formula $$(R—S)_n—(R'—S)_m$$

wherein R and R' are each divalent hydrocarbon radicals, preferably aliphatic divalent radicals, and particularly lower alkylene radicals containing up to 5 carbon are preferably obtained by polymerizing one or more compounds containing the epithio group

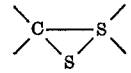

in their molecule.

Such polymerized sulfur containing compounds will be designated hereinafter as polyepisulfides. Examples of particularly suitable polyepisulfides are ethylene polyepisulfide, propylene polyepisulfide and ethylene episulfide propylene episulfide copolymers. Terpolymers containing ethylene episulfide and propylene episulfide which also contain within their molecule another compound having an epithio group, for example, allyloxymethylthiirane or epithiobutene are also suitable.

Surprisingly, the synergetic action which has been observed with the sulphur containing polymers described above, does not exist when the polyepisulfides are replaced by related compounds, for example by the polysulfide polymers produced by the reaction between a polyhaloalkane and an alkaline polysulfide.

In the stabilizing systems of the present invention, the weight ratio between the known stabilizers and the polyepisulfides varies perferably between 0.5 and 50.

The association of the above two types of components in a stabilizing system results in a synergetic action only in the case of plasticized polymeric compositions. It is surprising to observe that this synergetic action does not exist, even in the same compositions, when the compositions have not been plasticized.

The nature of the plasticizing agent which is used in the resinous compositions according to the invention is not critical.

For example, the plasticizing agent may be selected from any of the low molecular weight compounds or monomeric compounds commonly used for this purpose. Among the plasticizing agents used in preparing the present chlorinated vinyl polymer compositions are the following.

Phosphorous derivatives such as organic phosphates, including aliphatic hydrocarbon derivatives, for example, triethyl-, tributyl-, triisobutyl phosphates and the like; and aromatic hydrocarbon derivatives, for example, triphenyl-, tricresyl-, diphenylcresyl phosphates and the like.

Nitrogenous derivatives such as amines including long chain aliphatic amines, for example, hexyl-, octadecylamines, hexane diamine and the like; and cyclic and aromatic amines, for example, diphenylamine, acetylcyclohexylamine and the like; amides including fatty acid amides, for example, stearamide, oleamide and the like and nitro compounds.

Halogenated derivatives including halogenated paraffins, particularly chlorinated paraffins; halogenated esters, for example, methyl acetoxychlorstearate, chlorhydrin esters and the like; and halogenated phenols and phenol derivatives, for example, chlorphenols, chlorinated diphenylolpropane and the like.

Alcohols and phenols, including, for example, hexadecyloctadecyl alcohols, poly(ethylene) glycols, sorbitol and the like; and alkylphenols, for example, isododecyl-, amyl phenols and so forth; and aryl phenols, for example, benzyl-, phenylethyl phenols and the like.

Ketones, including aliphatic ketones, for example, hexylheptyl-, dinonyl ketones and the like; and cyclic ketones, for example, benzophenone, benzoine, furoine, and the like; and mixed ketones, for example, acetophenone, phenoxyacetophenone and the like.

Ethers including, for example dodecylethyl-, cetylethyl-, oleylethyl-, dodecylbutyl ethers, diglycol-, dixylenyl ethers and the like; and ethers of glycerol with aliphatic and aromatic alcohols.

Carboxylic acid esters including monocarboxylic fatty acid esters, for example, alkyl ricinoleates, -caprylates, -caprates, -pelargonates, -laurates, -stearates and so forth; and unsaturated fatty acid esters, for example, alkyl oleates and the like; and aromatic acid esters, for example, alkyl salicylates, -naphthenates and the like; and polycarboxylic acid esters, for example, alkyl sebacates, -phthalates, itaconates and the like.

The plasticizing agent also may be a macromolecular or polymeric compound. For example, chlorinated polyethylenes and copolymers of ethylene and vinyl acetate are particularly suitable. In addition polyisobutylenes, butadiene-acrylic nitrile copolymers may also be used. A further description of polymeric plasticizing agents is found in U.S. Patent 3,006,889. A full description of plasticizers which can be used for the present chlorinated vinyl polymer compositions is in "Chemie, Physik and Technologie der Weichmacher," K. Thinius, Veb Verlag Technik, Berlin, 1960, with particular reference to pages 318–820.

Among the chlorinated vinyl polymers which may be stabilized by the stabilizing systems according to the invention, there may be mentioned especially, polyvinyl chlorides and postchlorinated polyvinyl chlorides.

In the following examples which illustrate the best methods contemplated for carrying out the invention but which are not to be interpreted as limiting the scope of the invention in any manner whatsoever, the following method was used to measure the heat stabilities of the compositions:

A homogenous composition is formed by mixing the various ingredients at high temperature in a cylinder type mixer. Crepes are obtained which are cut into rectangular test pieces. These rectangular test pieces are inserted in a ventilated oven in which the temperature is raised to 180° C. in the case of polyvinyl chloride compositions and to 200° C. in the case of compositions containing postchlorinated polyvinyl chloride. The color changes of the samples with respect to time of residence are noted.

With compositions in which the known stabilizers are lead salts, there is an appreciable darkening after a certain period of time. For each sample, the time in minutes is measured after which the darkening is initiated, and then again after complete decomposition, indicated by a black coloring.

When the known stabilizers are calcium and zinc salts, there is no pronounced darkening, but after a certain period of time, there is a progressive change of the color until complete decomposition. A determination is made of the time in minutes during which the initial color of the sample remains unchanged and also of the time in minutes after there is complete decomposition.

Some examples are given by way of comparison to show the synergetic effect of the above stabilizing compositions on the thermal stability of the claimed composition.

Examples 1 to 5

The heat stabilities of the compositions given in Table 1 are measured. These compositions are given by way of comparison since they do not contain a plasticizing agent.

TABLE 1

| Composition, g. | Examples | | | | |
|---|---|---|---|---|---|
| | 1 | 2 | 3 | 4 | 5 |
| Polyvinyl chloride | 100 | 100 | 100 | 100 | 100 |
| Lubricating agents: | | | | | |
| Stearic alcohol | 1 | 1 | 1 | | |
| Montan wax | 0.5 | 0.5 | 0.5 | | |
| Known stabilizers: | | | | | |
| Diabasic lead phthalate | | | | 3 | 3 |
| Diabasic lead stearate | | | | 0.5 | 0.5 |
| Dibutyl tin mercaptide [1] | 2 | 2 | 2 | | |
| Epoxidized soya oil | 1 | 1 | 1 | | |
| Polyepisulfides: | | | | | |
| Copolymer of ethylene episulfide and propylene episulfide [2] | | | | | 0.1 |
| Ethylene polyepisulfide [3] | | 1 | | | |
| Propylene polyepisulfide [4] | | | 1 | | |
| Heat stability at 180° C. in minutes: | | | | | |
| Before darkening | 90–100 | 80–90 | 70–80 | 40–60 | 30–50 |
| Before complete decomposition | 130–140 | 110–120 | 100–110 | 160–170 | 160–170 |

[1] Sold under the name of ADVASTAB 17 M by Advance Solvents and Chemical Co.
[2] Copolymers in which the instrinsic viscosity measured in toluene at 90° C. is 0.05 l./g.; it has a propylene episulfide content of 0.725 mol. g./mol. g. of copolymer.
[3] Insoluble polymer, impossible to measure the intrinsic viscosity.
[4] Polymer having an intrinsic viscosity of 0.08 l./g.

Upon comparison of Examples 2, 3 and 5 and Examples 1 and 4, it is apparent that the introduction of a polyepisulfide into a composition which is not plasticized but which is stabilized by known stabilizing agents, does not improve the heat stability of the composition.

Examples 6 to 15

In Table 2, hereinbelow, data is given concerning stabilized compositions which are plasticized with ditridecyl phthalate.

Examples 19 and 20

The heat stability at 180° C. was determined for crepes made by mixing compositions defined in Table 4 which follows at 200° C.

TABLE 2

| Compositions | Examples | | | | | | | | | |
|---|---|---|---|---|---|---|---|---|---|---|
| | 6 | 7 | 8 | 9 | 10 | 11 | 12 | 13 | 14 | 15 |
| Polyvinyl chloride | 100 | 100 | 100 | 100 | 100 | 100 | 100 | 100 | 100 | 100 |
| Plasticizing agent, ditridecyl phthalate, g | 35 | 35 | 35 | 35 | 35 | 35 | 35 | 35 | 35 | 35 |
| Known stabilizers: | | | | | | | | | | |
| Tribasic lead sulfate, g | | | | | | | | 3 | 3 | 3 |
| Dibasic lead phthalate, g | 3 | 3.1 | 3 | | 3 | 3.85 | | | | |
| Lead stearate, g | 0.5 | 0.5 | 0.5 | | 0.5 | 0.65 | | 0.5 | 0.5 | 0.5 |
| 2-mercaptobenzimidazole, g | | | 0.1 | | | | | | | |
| Polyepisulfide costabilizer, g | ¹0.1 | | ¹3.6 | ¹1 | | ¹4.5 | ¹1 | | ²0.5 | |
| Heat stability at 180° C. in minutes: | | | | | | | | | | |
| Before darkening | 130–140 | 50–60 | 60–70 | 10–20 | 180–190 | 60–70 | 10–20 | 110–120 | 80–90 | 140–150 |
| Before complete decomposition | 200–220 | 160–170 | 140–150 | 30–40 | 200–220 | 140–160 | 30–40 | 160–170 | 130–140 | (³) |
| Properties before aging: | | | | | | | | | | |
| Breaking load, kg./cm.² | 196 | | 183 | | 191 | | | 200 | | |
| Elongation at rupture, percent | 218 | | 143 | | 212 | | | 207 | | |
| A 2 Shore Hardness | 60 | | 60 | | 60 | | | 55 | | |
| Properties after 5 days aging at 120° C.: | | | | | | | | | | |
| Breaking load, kg./cm.² | 197 | | 173 | | 202 | | | 202 | | |
| Elongation at rupture, percent | 198 | | 112 | | 215 | | | 202 | | |
| A 2 Shore Hardness | 60 | | 63 | | 60 | | | 60 | | |
| Change of weight, percent | +0.08 | | −0.17 | | +0.08 | | | −0.10 | | |
| Properties after 10 days aging at 120° C.: | | | | | | | | | | |
| Breaking load, kg./cm.² | 195 | | 178 | | 205 | | | 209 | | |
| Elongation at rupture, percent | 200 | | 118 | | 225 | | | 207 | | |
| A 2 Shore Hardness | 60 | | 60 | | 58 | | | 55 | | |
| Change of weight, percent | −0.21 | | −0.81 | | +0.20 | | | −0.60 | | |

¹ Ethylene episulfide-propylene episulfide copolymer in which the intrinsic viscosity measured in toluene at 90° C. is 0.05 l./g.; the propylene episulfide content is 0.725 mol .g./mol. g. of the copolymer.
² Propylene polyepisulfide in which the intrinsic viscosity is 0.08 l./g.
³ Higher than 170.

By incorporating a stabilizing system comprising one or more known stabilizing agents and one polyepisulfide, into a composition containing polyvinyl chloride which has been plasticized with ditridecyl phthalate, there is a noted improvement of the heat stability of the resinous composition with respect to the same composition stabilized only with one of the components of the stabilizing system as evidenced by comparing Example 6 to Examples 7, 8 and 9, Example 10 to Examples 11 and 12, and Examples 13 and 15 to Example 14.

Furthermore, some properties were determined on plates pressed at a temperature of 170° C. before aging and after an aging period of 5 to 10 days at 120° C. in a ventilated oven. The comparison of the results obtained showed that the simultaneous presence of a polyepisulfide and known stabilizing agents in the compositions have a favorable effect on the improvement of these properties.

Examples 16 to 18

Table 3, which follows, indicates the heat stabilities of compositions containing polyvinyl chloride, which have been plasticized by means of diisooctyl phthalate and in which the known stabilizers are calcium laurate and zinc laurate.

TABLE 3

| Compositions | Examples | | |
|---|---|---|---|
| | 16 | 17 | 18 |
| Polyvinyl chloride, g | 100 | 100 | 100 |
| Diisooctyl phthalate, g | 40 | 40 | 40 |
| Calcium laurate, g | 1 | 1.5 | |
| Zinc laurate, g | 1 | 1.5 | |
| Polyepisulfide,¹ g | 1 | | 3 |
| Initial color | Colorless | Colorless | Pink |
| Heat stability at 180° C | (²) | (³) | (⁴) |

¹ Propylene polyepisulfide in which the intrinsic viscosity measured in toluene at 90° C. is 0.08 l./g.
² Colorless for 30 minutes; black after 50 minutes.
³ Colorless for 10 minutes; black after 30 minutes.
⁴ Light brown after 10 minutes; black after 30 minutes.

It is apparent that using a total amount of 3 g. of the stabilizing agent per 100 g. of polymer, the three components system: calcium laurate, zinc laurate and polyepisulfide (Example 16) gives a heat stability which is obviously higher than when calcium laurate and zinc laurate (Example 17) or polyepisulfide alone (Example 18) is used.

TABLE 4

| Compositions | Examples | |
|---|---|---|
| | 19 | 20 |
| Polyvinyl chloride | 100 | 100 |
| HOSTALIT Z899/70 ¹ | 20 | 20 |
| Lead stearate | 1.5 | 1.5 |
| Cadmium stearate | 1 | 1 |
| Epoxidized soya oil | 1 | 1 |
| Polyepisulfide ² | | 1 |
| Heat stability at 180° C.: | | |
| Before darkening, min | 20–30 | 40–50 |
| Before complete decomposition, min | 40–50 | 60–70 |

¹ Trademark for plasticizing agent containing chlorinated polyethylene sold by Farbwerke Hoechst A.G.
² Ethylene episulfide-propylene episulfide copolymer in which the intrinsic viscosity in toluene at 90° C. is 0.05 l./g. and in which the propylene episulfide content is 0.725 mol. g./mol. g. of copolymer.

Examples 21 and 22

A determination was made of the heat stabilities at 200° C. of crepes made by mixing compositions containing post-chlorinated polyvinyl chloride containing 680 g. of chlorine by kilogram and plasticized with a copolymer of ethylene and vinyl acetate. The results are given in Table 5.

TABLE 5

| Compositions | Examples | |
|---|---|---|
| | 21 | 22 |
| Post-chlorinated polyvinyl chloride, g | 100 | 100 |
| Copolymer of ethylene and vinyl acetate containing 67% of ethylene, g | 5 | 5 |
| Montan wax, g | 1 | 1 |
| 3,5 epoxy-6-methylcyclohexylmethyl, 3,4 epoxy-6-methylhexanecarboxylate, g | 2 | 2 |
| Pentaerythritol, g | 0.6 | 0.6 |
| Ethylene polyepisulfide, g | | 0.5 |
| Heat stability at 200° C. in min.: | | |
| Before darkening | 40–50 | 60–70 |
| Before complete decomposition | 80–90 | 100–110 |

Examples 23 to 27

The following tests are given to illustrate that the polysulfide polymers resulting from the reaction between a polyhaloalkane and an alkaline polysulfide have no synergetic effect when mixed with the known stabilizing agents.

The results obtained are given in Table 6.

TABLE 6

| Compositions | Examples | | | | |
|---|---|---|---|---|---|
| | 23 | 24 | 25 | 26 | 27 |
| Polyvinyl chloride, g | 100 | 100 | 100 | 100 | 100 |
| Ditridecyl phthalate, g | 35 | 35 | 35 | 35 | 35 |
| Dibasic lead phthalate, g | 3 | 3 | 3 | 3 | 3 |
| Lead stearate, g | 0.5 | 0.5 | 0.5 | 0.5 | 0.5 |
| Polyepisulfide,[1] g | | 0.1 | | | |
| Polysulfide polymer, g | | | [2] 0.1 | [3] 0.1 | [4] 0.1 |
| Initial coloring | ([5]) | ([5]) | ([6]) | ([6]) | ([7]) |
| Heat stability at 180° C.: | | | | | |
| Before darkening, min | 40-50 | 130-140 | 70-80 | 80-90 | 80-90 |
| Before complete decomposition | 160-170 | 200-220 | 150-160 | 150-160 | 140-160 |

[1] Ethylene episulfide-propylene episulfide copolymer in which the intrinsic viscosity in toulene at 90° C. is 0.05 l./g. and in which the propylene episulfide content is 0.725 mol. g./mol. g. of copolymer.
[2] Liquid product resulting from the reaction of dichloroethylformaldehyde with an alkaline polysulfide in the presence of 2 mol. g. percent of trichloropropane.
[3] Liquid product resulting from the reaction of dichloroethylformaldehyde with an alkaline polysulfide in the presence of 0.5 mol. g. percent of trichloropropane.
[4] Solid product resulting from the reaction of dichloroethane with an alkaline polysulfide.
[5] White.
[6] White yellowish.
[7] Light gray.

The above results, show that 0.1 g. of the polysulfide polymers per 100 g. of resin do not improve or only slightly improve the heat stability. One the other hand, a high amount of these products, for example, 1 g. per 100 g. of the resin, produces a crepe having a dark grey color in which it is impossible to determine the heat stability.

Although specific embodiments of this invention have just been described, it is understood that modifications are permissible according to the invention, the scope of which is to be determined from the appended claims only.

What we claim and desire to secure by Letters Patent are:

1. A stabilized polymer composition comprising:
   chlorinated vinyl polymer selected from the group which consists of polyvinyl chloride and postchlorinated polyvinyl chloride,
   a plasticizing agent for said chlorinated vinyl polymer selected from a member of the group consisting of alkyl phthalate, chlorinated polyethylene and ethylene-vinylacetate copolymer and
   a stabilizing agent in an amount of 1 to 5 parts per weight per 100 parts by weight of said chlorinated vinyl polymer, said stabilizing agent comprising:
      at least one heat stabilizer for said chlorinated vinyl polymer selected from the group consisting calcium, cadmium, zinc and lead salts of organic carboxylic acids and sulfuric acid and
      at least one sulfur containing polymer selected from the group consisting of ethylene polyepisulfide, propylene polyepisulfide and ethylene episulfide-propylene episulfide copolymer,
   the weight ratio between said heat stabilizer and the sulfur containing polymer being between 2 and 35.

2. A stabilized polymer composition according to claim 1 in which said heat stabilizer for said chlorinated vinyl polymer is selected from at least one member of the group consisting of calcium, cadmium, zinc and lead salts of phthalic acid and of fatty carboxylic acids.

3. A stabilized polymer composition according to claim 1 in which said chlorinated vinyl polymer is polyvinyl chloride and in which said heat stabilizer for said chlorinated vinyl polymer comprises two salts selected from a member of the group consisting of salts of lead, calcium and zinc of sulfuric acid, phthalic acid, stearic acid and lauric acid, at least one of said salts being a salt of stearic or lauric acid.

4. A stabilized polymer composition according to claim 1 in which said chlorinated vinyl polymer is polyvinyl chloride, and said plasticizing agent is alkyl phthalate which is present in an amount of about 35 to 40 parts by weight per 100 parts by weight of said polyvinyl chloride and said heat stabilizing agent for polyvinyl chloride is comprised of at least two salts, one of said salts being selected from the group consisting of calcium, zinc and lead salts of stearic acid and lauric acid and one of said salts being selected from the group consisting of calcium, zinc and lead salts of sulfuric acid, phthalic acid, lauric acid and stearic acid.

5. A stabilized polymer composition according to claim 1 in which said chlorinated polymer is polyvinyl chloride and said plasticizing agent is chlorinated polyethylene which is present in an amount of about 20 to 25 parts per 100 parts of said polyvinyl chloride and said heat stabilizing agent for polyvinyl chloride is comprised of at least two salts, one of said salts being selected from the group consisting of calcium, zinc and lead salts of stearic acid and lauric acid and one of said salts being selected from the group consisting of calcium, zinc and lead salts of sulfuric acid, phthalic acid, lauric acid and stearic acid.

References Cited

UNITED STATES PATENTS 2,824,845   2/1958   Kosmin.
3,091,597   5/1963   Henriques _____ 260—31.8 X

FOREIGN PATENTS 1,489,772   6/1967   France.

MORRIS LIEBMAN, *Primary Examiner.*

L. T. JACOBS, *Assistant Examiner.*

U.S. Cl. X.R.

260—31.8, 45.7, 899